US012692381B2

(12) United States Patent
Jang et al.

(10) Patent No.: US 12,692,381 B2
(45) Date of Patent: Jul. 28, 2026

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Jeongmin Jang, Daejeon (KR); Chun Ho Park, Daejeon (KR); Yong Hee An, Daejeon (KR); Tae Hoon Kim, Daejeon (KR); Daeun Sung, Daejeon (KR); Wangrae Joe, Daejeon (KR)

(73) Assignee: LG CHEM, LTD., Seoul (KR)

( * ) Notice: Subject to any disclaimer, the term of this patent is extended or adjusted under 35 U.S.C. 154(b) by 847 days.

(21) Appl. No.: 17/910,194

(22) PCT Filed: Dec. 7, 2021

(86) PCT No.: PCT/KR2021/018417
§ 371 (c)(1),
(2) Date: Sep. 8, 2022

(87) PCT Pub. No.: WO2022/158709
PCT Pub. Date: Jul. 28, 2022

(65) Prior Publication Data
US 2023/0131897 A1 Apr. 27, 2023

(30) Foreign Application Priority Data
Jan. 22, 2021 (KR) ........................ 10-2021-0009294

(51) Int. Cl.
*C08L 51/00* (2006.01)
*B29C 48/00* (2019.01)
(Continued)

(52) U.S. Cl.
CPC .......... *C08L 51/003* (2013.01); *B29C 48/022* (2019.02); *B29C 48/40* (2019.02);
(Continued)

(58) Field of Classification Search
CPC combination set(s) only.
See application file for complete search history.

(56) References Cited

U.S. PATENT DOCUMENTS

| | | | |
|---|---|---|---|
| 4,885,335 A | 12/1989 | Gallucci | |
| 5,268,430 A | 12/1993 | Wang | |
| (Continued) | | | |

FOREIGN PATENT DOCUMENTS

| | | |
|---|---|---|
| CN | 110753727 A | 2/2020 |
| CN | 114514282 A | 5/2022 |
| (Continued) | | |

OTHER PUBLICATIONS

International Search Report and Written Opinion issued in corresponding International Patent Application No. PCT/KR2021/018417, dated Mar. 10, 2022.
(Continued)

*Primary Examiner* — Anthony J Frost
(74) *Attorney, Agent, or Firm* — Morgan, Lewis & Bockius LLP

(57) ABSTRACT

A thermoplastic resin composition can include 25 to 75% by weight of an alkyl acrylate-aromatic vinyl compound-vinyl cyanide compound graft copolymer (A) containing alkyl acrylate rubber having an average particle diameter of 50 to 120 nm; and 25 to 75% by weight of a (meth)acrylic acid alkyl ester compound-aromatic vinyl compound-vinyl cyanide compound non-graft copolymer (B). The thermoplastic resin composition has an alkyl acrylate coverage value (X) of 67% or more as calculated by Equation 1. A method of preparing the thermoplastic resin composition, and a molded article including the thermoplastic resin composition are also disclosed.

12 Claims, 1 Drawing Sheet

Example 3    Comparative Example 1    Comparative Example 6

(51) Int. Cl.

|  |  |
|---|---|
| *B29C 48/40* | (2019.01) |
| *C08F 212/08* | (2006.01) |
| *C08F 220/14* | (2006.01) |
| *C08F 220/44* | (2006.01) |
| *B29K 55/00* | (2006.01) |

(52) U.S. Cl.

CPC .......... *C08F 212/08* (2013.01); *C08F 220/14* (2013.01); *C08F 220/44* (2013.01); *B29K 2055/00* (2013.01); *C08L 2201/10* (2013.01); *C08L 2203/16* (2013.01); *C08L 2203/30* (2013.01); *C08L 2205/025* (2013.01)

(56) References Cited

U.S. PATENT DOCUMENTS

| | | | |
|---|---|---|---|
| 5,780,198 A | 7/1998 | Goto et al. | |
| 2006/0148992 A1 | 7/2006 | Kim et al. | |
| 2007/0203293 A1 | 8/2007 | Ahn et al. | |
| 2010/0016507 A1* | 1/2010 | Sumimoto ............ | C08F 265/06 525/70 |
| 2015/0315430 A1 | 11/2015 | Nguyen et al. | |
| 2016/0002455 A1 | 1/2016 | Chung et al. | |
| 2018/0134889 A1* | 5/2018 | Lee ....................... | C08F 279/02 |
| 2019/0023892 A1* | 1/2019 | Kang ..................... | C08L 55/00 |
| 2019/0330463 A1 | 10/2019 | Shim et al. | |
| 2020/0216653 A1 | 7/2020 | Kang et al. | |
| 2021/0108070 A1 | 4/2021 | Park et al. | |
| 2021/0214544 A1 | 7/2021 | Park et al. | |
| 2022/0348761 A1 | 11/2022 | Lee et al. | |
| 2022/0356340 A1 | 11/2022 | Park et al. | |
| 2022/0372269 A1 | 11/2022 | Jeon et al. | |
| 2022/0403153 A1 | 12/2022 | Kim et al. | |

FOREIGN PATENT DOCUMENTS

| | | | |
|---|---|---|---|
| EP | 0420005 A1 | 4/1991 | |
| EP | 0533442 A1 | 3/1993 | |
| EP | 3385327 A1 | 10/2018 | |
| EP | 4006102 A1 | 6/2022 | |
| EP | 4019587 A1 | 6/2022 | |
| EP | 4019589 A1 | 6/2022 | |
| JP | 07-033470 B2 | 4/1995 | |
| JP | 2005-187667 A | 7/2005 | |
| JP | 2005272496 A | * 10/2005 | |
| JP | 2006-056961 A | 3/2006 | |
| JP | 2012-251015 A | 12/2012 | |
| KR | 10-2004-0105464 A | 12/2004 | |
| KR | 10-2007-0027775 A | 3/2007 | |
| KR | 10-0771355 B1 | 10/2007 | |
| KR | 10-2008-0020994 A | 3/2008 | |
| KR | 10-2012-0009860 A | 2/2012 | |
| KR | 10-2014-0041666 A | 4/2014 | |
| KR | 10-1486564 B1 | 1/2015 | |
| KR | 10-2015-0072095 A | 6/2015 | |
| KR | 10-2018-0075743 A | 7/2018 | |
| KR | 10-2020-0042558 A | 4/2020 | |
| KR | 10-2020-0055662 A | 5/2020 | |
| KR | 10-2020-0055675 A | 5/2020 | |
| KR | 10-2020-0089101 A | 7/2020 | |
| KR | 10-2022-0020201 A | 2/2022 | |
| TW | 201434907 A | 9/2014 | |
| WO | 2019/083153 A1 | 5/2019 | |

OTHER PUBLICATIONS

Communication issued Aug. 14, 2023 for counterpart European Patent Application No. 21921468.1.

Communication issued Aug. 9, 2023 for counterpart Chinese Patent Application No. 202180019291.7.

Second Office Action dated Apr. 8, 2024 from the JPO corresponding Japanese Patent Application No. 2022-553654.

Office Action dated Dec. 3, 2024 issued in corresponding Taiwanese Patent Application No. 110146995. (Note: JP2006-56961 and US 2010/0016507 cited therein are already of record.).

* cited by examiner

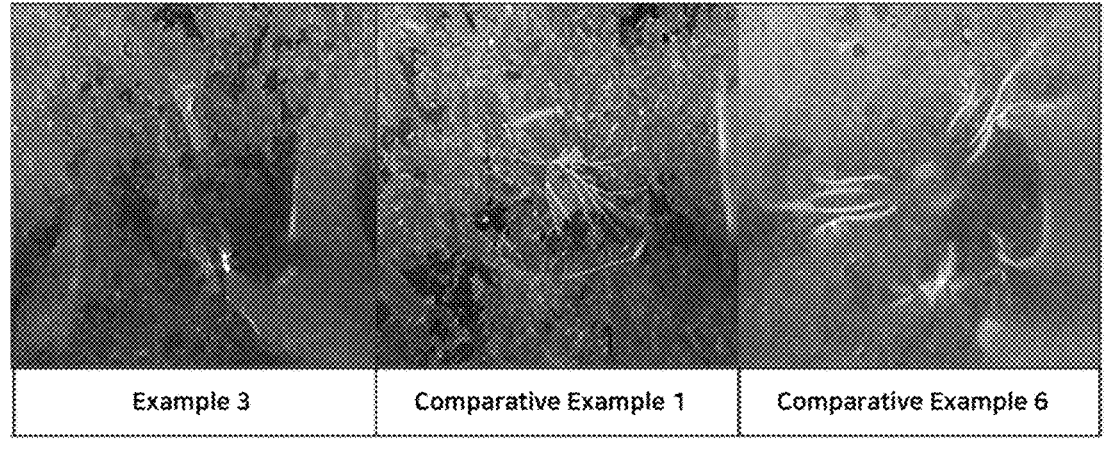
| Example 3 | Comparative Example 1 | Comparative Example 6 |

THERMOPLASTIC RESIN COMPOSITION, METHOD OF PREPARING THE SAME, AND MOLDED ARTICLE INCLUDING THE SAME

CROSS-REFERENCE TO RELATED APPLICATION

This application claims priority to Korean Patent Application No. 10-2021-0009294, filed on Jan. 22, 2021 in the Korean Intellectual Property Office, the disclosure of which is incorporated herein by reference.

TECHNICAL FIELD

The present invention relates to a thermoplastic resin composition, a method of preparing the same, and a molded article including the same. More particularly, the present invention relates to a thermoplastic resin composition that has mechanical properties, such as impact strength, tensile strength, and flexural strength, and surface hardness equal or superior to those of a conventional ASA-based resin composition, has excellent transparency and colorability, is capable of preventing occurrence of whitening during bending due to excellent non-whitening properties, and thus, has excellent surface appearance; a method of preparing the thermoplastic resin composition, and a molded article including the thermoplastic resin composition.

BACKGROUND ART

Acrylate-styrene-acrylonitrile copolymers (hereinafter referred to as "ASA resins") have weather resistance, aging resistance, chemical resistance, rigidity, impact resistance, and processability, and have been used in various fields such as automobiles, miscellaneous goods, and construction materials.

In addition, as the importance of aesthetics increases in the market, research is being conducted to realize a luxurious appearance and excellent colorability and weather resistance by finishing the surface of a substrate, such as an acrylonitrile-butadiene-styrene resin, a polyvinyl chloride resin, a polyethyleneterephthalate resin, or an iron plate, with an ASA resin.

However, due to the characteristics of ASA resins, when finishing treatment is performed at room temperature, whitening may occur on the surface of a product depending on the shape of the product in a processing process such as cutting, bending, and molding. Due to whitening, the original color of the product disappears, and aesthetics is impaired. This phenomenon is caused by voids due to cracks generated inside an ASA resin. To solve this problem, a method of softening a resin by increasing a rubber content has been tried. Since the mechanical properties of a softened ASA resin are different from those of a conventional ASA resin, the use of the softened ASA resin is limited.

Therefore, there is a need to develop a thermoplastic resin composition having excellent transparency, colorability, and non-whitening properties while having mechanical properties and surface hardness similar to those of conventional ASA-based resin compositions.

RELATED ART DOCUMENTS

Patent Documents

Japanese Patent No. 1995-033470

DISCLOSURE

Technical Problem

Therefore, the present invention has been made in view of the above problems, and it is one object of the present invention to provide a thermoplastic resin composition that has mechanical properties, such as impact strength, tensile strength, and flexural strength, and surface hardness equal or superior to those of a conventional ASA-based resin composition, has excellent transparency and colorability, is capable of preventing occurrence of whitening during bending due to excellent non-whitening properties, and thus, has excellent surface appearance.

It is another object of the present invention to provide a method of preparing the thermoplastic resin composition.

It is yet another object of the present invention to provide a molded article manufactured using the thermoplastic resin composition.

The above and other objects can be accomplished by the present invention described below.

Technical Solution

In accordance with one aspect of the present invention, provided is a thermoplastic resin composition including 25 to 75% by weight of an alkyl acrylate-aromatic vinyl compound-vinyl cyanide compound graft copolymer (A) containing alkyl acrylate rubber having an average particle diameter of 50 to 120 nm; and 25 to 75% by weight of a (meth)acrylic acid alkyl ester compound-aromatic vinyl compound-vinyl cyanide compound non-graft copolymer (B), wherein the thermoplastic resin composition has an alkyl acrylate coverage value (X) of 67% or more as calculated by Equation 1 below:

$$X=\{(G-Y)/Y\}\times100, \qquad \text{[Equation 1]}$$

wherein G represents a gel content (wt %) based on a total weight of the thermoplastic resin composition, and Y represents a content (wt %) of an alkyl acrylate in the gel based on a total weight of the thermoplastic resin composition.

In addition, the present invention may provide a thermoplastic resin composition including 25 to 75% by weight of an alkyl acrylate-aromatic vinyl compound-vinyl cyanide compound graft copolymer (A) containing alkyl acrylate rubber having an average particle diameter of 50 to 120 nm; and 25 to 75% by weight of a (meth)acrylic acid alkyl ester compound-aromatic vinyl compound-vinyl cyanide compound non-graft copolymer (B), wherein the non-graft copolymer (B) includes 60 to 85% by weight of a (meth)acrylic acid alkyl ester compound, 5 to 30% by weight of an aromatic vinyl compound, and 1 to 25% by weight of a vinyl cyanide compound.

In addition, the present invention may provide a thermoplastic resin composition including 25 to 75% by weight of an alkyl acrylate-aromatic vinyl compound-vinyl cyanide compound graft copolymer (A) containing alkyl acrylate rubber having an average particle diameter of 50 to 120 nm; and 25 to 75% by weight of a (meth)acrylic acid alkyl ester compound-aromatic vinyl compound-vinyl cyanide compound non-graft copolymer (B), wherein the thermoplastic resin composition has a total light transmittance (Tt) of 74% or more as measured using an injection specimen having a thickness of 3 T according to ASTM D-1003.

In accordance with another aspect of the present invention, provided is a method of preparing a thermoplastic resin composition, the method including kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 50 to 120 nm and 25 to 75% by weight of a (meth)acrylic acid alkyl ester compound-aromatic vinyl compound-vinyl cyanide compound non-graft copolymer (B), wherein the thermoplastic resin composition has an alkyl acrylate coverage value (X) of 67% or more as calculated by Equation 1 below:

$$X = \{(G-Y)/Y\} \times 100, \qquad \text{[Equation 1]}$$

wherein G represents a gel content (wt %) based on a total weight of the thermoplastic resin composition, and Y represents a content (wt %) of an alkyl acrylate in the gel based on a total weight of the thermoplastic resin composition.

In addition, the present invention may provide a method of preparing a thermoplastic resin composition, the method including kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 50 to 120 nm and 25 to 75% by weight of a (meth)acrylic acid alkyl ester compound-aromatic vinyl compound-vinyl cyanide compound non-graft copolymer (B), wherein the non-graft copolymer (B) includes 60 to 85% by weight of a (meth)acrylic acid alkyl ester compound, 5 to 30% by weight of an aromatic vinyl compound, and 1 to 25% by weight of a vinyl cyanide compound.

In addition, the present invention may provide a method of preparing a thermoplastic resin composition, the method including kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 50 to 120 nm and 25 to 75% by weight of a (meth)acrylic acid alkyl ester compound-aromatic vinyl compound-vinyl cyanide compound non-graft copolymer (B), wherein the thermoplastic resin composition has a total light transmittance (Tt) of 74% or more as measured using an injection specimen having a thickness of 3 T according to ASTM In accordance with yet another aspect of the present invention, provided is a molded article including the thermoplastic resin composition.

Advantageous Effects

According to the present invention, the present invention has an effect of providing a thermoplastic resin composition that has mechanical properties, such as impact strength, tensile strength, and flexural strength, and surface hardness equal or superior to those of a conventional ASA-based resin composition, has excellent transparency and colorability, is capable of preventing occurrence of whitening during bending due to excellent non-whitening properties, and thus, has excellent surface appearance; a method of preparing the thermoplastic resin composition; and a molded article including the thermoplastic resin composition. In particular, the thermoplastic resin composition of the present invention can be used in the manufacture of finishing materials, decorative sheets, and the like requiring a luxurious appearance.

DESCRIPTION OF DRAWINGS

FIG. 1 includes images taken after ball dropping-induced impact is applied to T-die extrusion films manufactured in Example 3 and Comparative Examples 1 and 6.

BEST MODE

Hereinafter, a thermoplastic resin composition, a method of preparing the same, and a molded article including the same according to the present invention will be described in detail.

The present inventors confirmed that, when an alkyl acrylate-aromatic vinyl compound-vinyl cyanide compound graft copolymer containing rubber having a predetermined average particle diameter and a (meth)acrylic acid alkyl ester compound-aromatic vinyl compound-vinyl cyanide compound non-graft copolymer were mixed in a predetermined composition ratio, and an alkyl acrylate coverage value was adjusted within a predetermined range, compared to a conventional ASA-based resin composition, mechanical properties, surface hardness, transparency, and colorability were improved, and occurrence of whitening during bending was prevented due to excellent non-whitening properties. Based on these results, the present inventors conducted further studies to complete the present invention.

The thermoplastic resin composition of the present invention includes 25 to 75% by weight of an alkyl acrylate-aromatic vinyl compound-vinyl cyanide compound graft copolymer (A) containing alkyl acrylate rubber having an average particle diameter of 50 to 120 nm; and 25 to 75% by weight of a (meth)acrylic acid alkyl ester compound-aromatic vinyl compound-vinyl cyanide compound non-graft copolymer (B), wherein the thermoplastic resin composition has an alkyl acrylate coverage value (X) of 67% or more as calculated by Equation 1 below:

$$X = \{(G-Y)/Y\} \times 100 \qquad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

In this case, the thermoplastic resin composition may have mechanical properties, such as impact strength, tensile strength, and flexural strength, and surface hardness equal or superior to those of a conventional ASA-based resin, may have excellent transparency and colorability, may prevent occurrence of whitening during bending due to excellent non-whitening properties, and thus, may have excellent surface appearance.

Hereinafter, each component constituting the thermoplastic resin composition of the present invention will be described in detail.

(A) Alkyl Acrylate-Aromatic Vinyl Compound-Vinyl Cyanide Compound Graft Copolymer For example, the graft copolymer (A) may contain alkyl acrylate rubber having an average particle diameter of 50 to 120 nm, preferably 60 to 120 nm, still more preferably 80 to 110 nm. Within this range, a finally prepared thermoplastic resin composition may have excellent impact strength, light resistance, and gloss.

In this description, the average particle diameter may be measured by dynamic light scattering, and specifically, may be measured as an intensity value using a particle size analyzer (product name: Nicomp 380, manufacturer: PSS) in a Gaussian mode. As a specific measurement example, a sample may be prepared by diluting 0.1 g of latex (total solids content: 35 to 50 wt %) 1,000 to 5,000-fold with distilled water, and average particle diameter may be measured using flow cells in an auto-dilution manner and in a mode of dynamic light scattering/intensity 300 kHz/intensity-weight Gaussian analysis. At this time, temperature may be set to 23° C., measurement wavelength may be set to 632.8 nm, and channel width may be set to 10 psec.

For example, based on a total weight of the components (A) and (B), the graft copolymer (A) may be included in an amount of 25 to 75% by weight, preferably 30 to 70% by weight, more preferably 30 to 60% by weight, still more preferably 30 to 55% by weight. Within this range, mechanical properties, such as impact strength, tensile strength, and flexural strength, gloss, surface hardness, and processability may be excellent.

For example, the graft copolymer (A) may include 20 to 60% by weight of alkyl acrylate rubber (a-1) and 40 to 80% by weight of an aromatic vinyl compound-vinyl cyanide compound copolymer (a-2), preferably 30 to 50% by weight of alkyl acrylate rubber (a-1) and 50 to 70% by weight of an aromatic vinyl compound-vinyl cyanide compound copolymer (a-2), more preferably 40 to 50% by weight of alkyl acrylate rubber (a-1) and 50 to 60% by weight of an aromatic vinyl compound-vinyl cyanide compound copolymer (a-2). Within this range, mechanical properties, gloss, and surface hardness may be excellent.

In this description, a polymer including a certain compound means a polymer prepared by polymerizing the compound, and a unit in the polymer is derived from the compound.

For example, the alkyl acrylate rubber (a-1) may further include an aromatic vinyl compound. In this case, chemical resistance and impact resistance may be excellent. For example, based on 100% by weight in total of the acrylate rubber, the alkyl acrylate rubber (a-1) may include the aromatic vinyl compound in an amount of 0.1 to 25% by weight, preferably 2 to 23% by weight, more preferably 5 to 20% by weight, still more preferably 5 to 16% by weight, still more preferably 10 to 16% by weight. Within this range, mechanical properties, gloss, and surface hardness may be excellent without deterioration of physical properties.

For example, the copolymer (a-2) may further include an alkyl acrylate. In this case, physical property balance between impact resistance, weather resistance, processability, and non-whitening properties may be excellent.

For example, based on 100% by weight in total of the copolymer (a-2), the copolymer (a-2) may include 55 to 85% by weight of an aromatic vinyl compound, 10 to 30% by weight of a vinyl cyanide compound, and 0.1 to 20% by weight of an alkyl acrylate, preferably 60 to 80% by weight of an aromatic vinyl compound, 13 to 26% by weight of a vinyl cyanide compound, and 3 to 20% by weight of an alkyl acrylate, more preferably 65 to 78% by weight of an aromatic vinyl compound, 15 to 22% by weight of a vinyl cyanide compound, and 5 to 20% by weight of an alkyl acrylate. Within this range, impact resistance and weather resistance may be excellent.

For example, the graft copolymer (A) may be prepared by emulsion polymerization. In this case, gloss and surface hardness may be excellent.

For example, the alkyl acrylate may be an alkyl acrylate containing an alkyl group having 1 to 15 carbon atoms, preferably includes one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate, and lauryl acrylate. More preferably, the alkyl acrylate is an alkyl acrylate having 2 to 8 carbon atoms, still more preferably butyl acrylate, ethylhexyl acrylate, or a mixture thereof, still more preferably butyl acrylate.

For example, the aromatic vinyl compound may include one or more selected from the group consisting of styrene, α-methyl styrene, o-methyl styrene, p-methyl styrene, m-methyl styrene, ethyl styrene, isobutyl styrene, t-butyl styrene, o-bromostyrene, p-bromostyrene, m-bromostyrene, o-chlorostyrene, p-chlorostyrene, m-chlorostyrene, vinyltoluene, vinylxylene, fluorostyrene, and vinylnaphthalene, preferably one or more selected from the group consisting of styrene and α-methyl styrene, more preferably styrene. In this case, processability may be excellent due to proper fluidity, and mechanical properties such as impact resistance may be excellent.

For example, the vinyl cyanide compound may include one or more selected from the group consisting of acrylonitrile, methacrylonitrile, ethylacrylonitrile, and isopropylacrylonitrile, preferably acrylonitrile.

Emulsion polymerization commonly practiced in the art to which the present invention pertains may be used in the present invention without particular limitation.

For example, the graft copolymer (A) may have a grafting degree of 55 to 150%, preferably 60 to 130%, more preferably 65 to 100%, still more preferably 65 to 80% as calculated by Equation 3 below. Within this range, gloss, colorability, and transparency may be excellent, and due to excellent non-whitening properties, occurrence of whitening during bending may be prevented.

$$\text{Grafting degree (\%)}=[\text{Weight } (g) \text{ of grafted monomers/Rubber weight } (g)]\times100 \quad \text{[Equation 3]}$$

In Equation 3, the weight (g) of grafted monomers is obtained by subtracting the rubber weight (g) from the weight of insoluble matter (gel) obtained by dissolving a graft copolymer in acetone and performing centrifugation, and the rubber weight (g) is the weight (g) of rubber components theoretically added to graft copolymer powder.

When the weight of insoluble matter (gel) is measured, 0.5 g of powdered graft copolymer (A) is added to 50 ml of acetone, followed by stirring at room temperature for 12 hours. Then, centrifugation is performed to separate insoluble matter that is not dissolved in acetone, followed by drying for 12 hours. Then, the weight of the insoluble matter (gel) is measured. The rubber weight (g) is the weight (g) of rubber components theoretically added to 0.5 g of the powdered graft copolymer (A).

As a specific measurement example, when measuring the weight (g) of insoluble matter (gel), 0.5 g of a powdered graft copolymer is added to 50 ml of acetone, followed by stirring at 210 rpm and room temperature using an orbital shaker (equipment name: Lab companion SKC-6075) for 12 hours. Then, centrifugation is performed at 0° C. and 18,000 rpm for 3 hours using a centrifuge (Supra R30, Hanil Science Co.) to separate insoluble matter that is not dissolved in acetone, followed by drying in a forced convection oven (equipment name: Lab companion OF-12GW) set to 85° C. for 12 hours via forced circulation. Then, the weight of the insoluble matter (gel) is measured.

(B) (Meth)acrylic Acid Alkyl Ester Compound-Aromatic Vinyl Compound-Vinyl Cyanide Compound Non-Graft Copolymer For example, based on a total weight of the components (A) and (B), the non-graft copolymer (B) may be included in an amount of 25 to 75% by weight, preferably 30 to 70% by weight, more preferably 40 to 70% by weight, still more preferably 45 to 70% by weight. Within this range, mechanical properties, such as impact strength, tensile strength, and flexural strength, surface hardness, transparency, colorability, and processability may be excellent, and due to excellent non-whitening properties, occurrence of whitening during bending may be prevented.

For example, the non-graft copolymer (B) may include 60 to 85% by weight of a (meth)acrylic acid alkyl ester compound, 5 to 30% by weight of an aromatic vinyl compound, and 1 to 25% by weight of a vinyl cyanide compound, preferably 65 to 85% by weight of a (meth)acrylic acid alkyl ester compound, 10 to 25% by weight of an aromatic vinyl compound, and 5 to 20% by weight of a vinyl cyanide compound, more preferably 70 to 80% by weight of a (meth)acrylic acid alkyl ester compound, 10 to 20% by weight of an aromatic vinyl compound, and 5 to 10% by weight of a vinyl cyanide compound. In this case, weather resistance, transparency, and colorability may be excellent.

For example, the (meth)acrylic acid alkyl ester compound may be a methacrylic acid alkyl ester compound, an acrylic acid alkyl ester compound, or a mixture thereof.

Preferably, the (meth)acrylic acid alkyl ester compound may include one or more selected from the group consisting of (meth)acrylic acid methyl ester, (meth)acrylic acid ethyl ester, (meth)acrylic acid propyl ester, (meth)acrylic acid 2-ethyl hexyl ester, (meth)acrylic acid decyl ester, and (meth)acrylic acid lauryl ester, more preferably methylmethacrylate.

The types of the aromatic vinyl compound and the vinyl cyanide compound included in the non-graft copolymer (B) may be the same as the types of the aromatic vinyl compound and the vinyl cyanide compound included in the graft copolymer (A) of the present invention.

For example, the non-graft copolymer (B) may have a weight average molecular weight of 30,000 to 150,000 g/mol, preferably 40,000 to 140,000 g/mol, more preferably 50,000 to 130,000 g/mol, still more preferably 70,000 to 130,000 g/mol. Within this range, weather resistance, tensile strength, and impact strength may be excellent.

As another example, the non-graft copolymer (B) may have a weight average molecular weight within a mixed range including a range of 30,000 to 110,000 g/mol and a range of greater than 110,000 g/mol and less than or equal to 150,000 g/mol, preferably a weight average molecular weight within a mixed range including a range of 40,000 to 100,000 g/mol and a range of 110,000 to 140,000 g/mol, more preferably a weight average molecular weight within a mixed range including a range of 50,000 to 90,000 g/mol and a range of 120,000 to 140,000 g/mol. In this case, weather resistance, tensile strength, flexural strength, and impact strength may be excellent.

In this description, unless otherwise defined, the weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. As a specific measurement example, the weight average molecular weight may be measured under conditions of solvent: THF, column temperature: 40° C., flow rate: 0.3 ml/min, sample concentration: 20 mg/ml, injection amount: 5 µl, column model: 1×PLgel 10 µm MiniMix-B (250×4.6 mm)+ 1×PLgel 10 µm MiniMix-B (250×4.6 mm)+1×PLgel 10 µm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

The non-graft copolymer (B) may be prepared by solution polymerization, bulk polymerization, emulsion polymerization, or suspension polymerization, preferably bulk polymerization. Solution polymerization, bulk polymerization, emulsion polymerization, and suspension polymerization commonly practiced in the art to which the present invention pertains may be used in the present invention without particular limitation.

Thermoplastic Resin Composition

The thermoplastic resin composition of the present invention preferably has an alkyl acrylate coverage value (X) of 67% or more, more preferably 67 to 150%, still more preferably 70 to 140%, still more preferably 75 to 120% still more preferably 75 to 110% as calculated by Equation 1 below. Within this range, transparency and colorability may be excellent. In particular, occurrence of whitening during bending may be prevented due to excellent non-whitening properties.

$$X = \{(G-Y)/Y\} \times 100 \qquad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

In Equation 1, the content of the alkyl acrylate in the gel of the thermoplastic resin composition is the content of an alkyl acrylate (based on 100% by weight in total of the added thermoplastic resin composition) in insoluble matter obtained in the process of measuring the gel content. Here, the gel content is the content of insoluble matter based on 100% by weight in total of the thermoplastic resin composition.

The content of an alkyl acrylate in the gel may be quantitatively measured by nuclear magnetic resonance (NMR) analysis or Fourier transform infrared spectroscopy (FT-IR) analysis.

In this description, unless otherwise specified, NMR analysis means analysis by $^1$H NMR.

In this description, NMR analysis commonly performed in the art may be used in the present invention, and a specific measurement example is as follows.

Equipment name: Bruker 600 MHz NMR (AVANCE III HD) CPP BB (1H 19F tunable and broadband, with z-gradient) Prodigy Probe Measurement conditions: $^1$H NMR (zg30): ns=32, d1=5 s, TCE-d2, at room temperature In this description, FT-IR analysis may be performed using a method generally practiced in the art, and specific measurement examples are as follows.

Equipment name: Agilent Cary 660

Measurement conditions: ATR mode

When measuring the gel content, 1 g of a thermoplastic resin composition is added to 30 ml of acetone, followed by stirring at room temperature for 12 hours. Then, centrifugation is performed to separate insoluble matter that is not dissolved in acetone, followed by drying for 12 hours. Then, the gel content is measured and calculated by Equation 2 below. As a specific measurement example, when measuring the gel content, 1 g of a thermoplastic resin composition is added to 30 ml of acetone, followed by stirring at 210 rpm and room temperature using an orbital shaker (equipment name: Lab companion SKC-6075) for 12 hours. Then, centrifugation is performed at 0° C. and 18,000 rpm for 3 hours using a centrifuge (Supra R30, Hanil Science Co.) to separate insoluble matter that is not dissolved in acetone, followed by drying in a forced convection oven (equipment name: Lab companion OF-12GW) set to 85° C. for 12 hours via forced circulation. Then, the gel content is measured.

$$Gel \text{ content } (\%) = [\text{Weight } (g) \text{ of insoluble matter} (gel)/\text{Weight } (g) \text{ of sample}] \times 100 \quad \text{[Equation 2]}$$

In this description, the alkyl acrylate coverage value is a parameter for measuring the degree of dispersion of an aromatic vinyl compound-vinyl cyanide compound polymer grafted onto alkyl acrylate rubber in the thermoplastic resin composition. When the alkyl acrylate coverage value is high, the aromatic vinyl compound-vinyl cyanide compound polymer is evenly grafted onto the alkyl acrylate rubber to cover the alkyl acrylate rubber uniformly, thereby increasing gloss and achieving excellent tensile strength, colorability and non-whitening properties. In addition, as the alkyl acrylate coverage value increases, the distance between rubber particles is decreased, thereby reducing voids due to cracks occurring inside the thermoplastic resin composition and suppressing whitening during bending.

The alkyl acrylate coverage value is obtained by quantitatively calculating the content of the alkyl acrylate present in the thermoplastic resin composition through nuclear magnetic resonance (NMR) analysis or Fourier transform infrared spectroscopy (FT-IR) analysis, and the grafting degree is obtained based on the content of rubber components added during polymerization.

In addition, the grafting degree is a parameter indicating a degree to which an aromatic vinyl compound-vinyl cyanide compound polymer is grafted onto alkyl acrylate rubber in an alkyl acrylate-aromatic vinyl compound-vinyl cyanide compound graft copolymer.

For example, the thermoplastic resin composition may have a total light transmittance (Tt) of 74% or more, preferably 80% or more, more preferably 80 to 95%, still more preferably 80 to 90% as measured using an injection specimen having a thickness of 3 T according to ASTM D-1003. Within this range, physical property balance, transparency, colorability, and non-whitening properties may be excellent.

For example, the thermoplastic resin composition may have a haze of 10% or less, preferably 8% or less, more preferably 6% or less, still more preferably 1 to 6% as measured using an injection specimen having a thickness of 3 T according to ASTM D-1003. Within this range, physical property balance, transparency, colorability, and non-whitening properties may be excellent.

For example, the thermoplastic resin composition may have a gloss of 125 or more, preferably 130 or more, more preferably 130 to 170, still more preferably 140 to 160 as measured at an angle of incidence of 45° using a gloss meter according to ASTM D2457. Within this range, physical property balance, transparency, colorability, and non-whitening properties may be excellent.

For example, when a 1 kg weight is vertically dropped onto an extruded film having dimensions of 0.15 mm×10 cm×10 cm in thickness, width, and length from a height of 25 cm using a Gardner impact tester, haze values before and after impact are measured for a portion of the film hit by the weight according to ASTM D1003, and a difference in the haze values is calculated, the thermoplastic resin composition may have a haze difference (Δ haze) of 6.7 or less, preferably 5.8 or less, more preferably 5 or less, still more preferably 0.1 to 5. Within this range, since the thermoplastic resin has excellent non-whitening properties with respect to external impact (strike), the thermoplastic resin may have an excellent appearance.

For example, the thermoplastic resin composition may have an Izod impact strength (specimen thickness: ¼", room temperature) of 3 kgf·cm/cm or more, preferably 3 to 10 kgf·cm/cm, more preferably 4 to 9 kgf·cm/cm as measured according to ASTM D256. Within this range, physical property balance and non-whitening properties may be excellent.

In this description, the room temperature may be a temperature within 20±5° C.

For example, the thermoplastic resin composition may have a tensile strength of 250 kgf/cm$^2$ or more, preferably 300 kgf/cm$^2$ or more, more preferably 300 to 650 kgf/cm$^2$, still more preferably 350 to 600 kgf/cm$^2$ as measured at a cross head speed of 50 mm/min using a specimen having a thickness of 3.2 mm according to ASTM D638. Within this range, physical property balance and non-whitening properties may be excellent.

For example, the thermoplastic resin composition may have a flexural strength of 450 kgf/cm$^2$ or more, preferably 550 kgf/cm$^2$ or more, more preferably 550 to 950 kgf/cm$^2$, still more preferably 600 to 900 kgf/cm$^2$ as measured at a span of 64 mm and a test speed of 10 mm/min using a specimen having a thickness of 3.2 mm according to ASTM D790. Within this range, physical property balance and non-whitening properties may be excellent.

For example, the thermoplastic resin composition may have a Rockwell hardness of 70 or more, preferably 80 or more, more preferably 90 or more, still more preferably 90 to 120 as measured in an R-scale according to ASTM D785. Within this range, occurrence of press marks may be prevented, and physical property balance may be excellent.

The thermoplastic resin composition has excellent T-die extrusion moldability. For example, when a sheet having a thickness of 0.15 mm is manufactured using a T-die extruder, the sheet is cut to a length of 100 cm, thickness is measured at 10 or more locations in an area except for an area within 2 to 3 cm from both ends of the sheet, and thickness deviation is calculated based on a difference between maximum and minimum thicknesses, the thermoplastic resin composition may have a thickness deviation of 0.07 mm or less, preferably 0.06 mm or less, more preferably 0.01 to 0.06 mm, still more preferably 0.01 to 0.05 mm. In this case, physical property balance and non-whitening properties may be excellent.

As a specific example of the T-die extrusion processing, T-die extrusion may be performed at an extrusion screw speed of 150 to 200 rpm, an extrusion temperature of 200 to 300° C., a 3-axis roll temperature of 80 to 90° C., and a roll rotation speed of 1 to 5 m/min using a T-die extruder to prepare a sheet having a thickness of 0.15 mm.

For example, as the T-die extrusion processing machine, ST32HS (twin screw, 32 T, L/D=44) manufactured by Hankook E.M Co. may be used.

In this description, the thickness may be measured using ABSOLUTE ID-C1012BS (Mitutoyo Co.).

For example, when the thermoplastic resin composition is extruded at an extrusion screw speed of 150 to 200 rpm, an extrusion temperature of 200 to 300° C., a 3-axis roll temperature of 80 to 90° C., and a roll rotation speed 2 to 4 m/min using a T-die extruder, a sheet of 80 cm or more may be obtained without tearing of the sheet. In this case, physical property balance and non-whitening properties may be excellent, and excellent extrusion processability may be secured even at high roll rotation speed.

For example, ST32HS (twin screw, 32 T, L/D=44) manufactured by Hankook E.M Company may be used as the T-die extruder.

For example, when calendering of the thermoplastic resin composition is performed using a roll mill machine equipped with calendering rolls arranged at an interval of 0.3 mm to prepare a sheet having dimensions of 15 cm×15 cm in length and width, thickness is measured at 10 or more locations in an area except for an area within 2 to 3 cm from both ends of the sheet, and thickness deviation is calculated based on a difference between the maximum and minimum thicknesses, the thermoplastic resin composition may have a thickness deviation of 0.1 mm or less, preferably 0.09 mm or less, more preferably 0.07 mm or less, still more preferably 0.01 to 0.07 mm, still more preferably 0.01 to 0.06 mm. Within this range, sheet quality and physical property balance may be excellent, and processability during calendering may be excellent.

For example, the calendering may be performed at a temperature of two calendering rolls of 180 to 220° C. and a calendering roll speed of 8 to 12 rpm under the condition of roll-to-roll distance of 0.3 mm using a roll mill machine.

For example, the calendering may be performed using a roll mill machine (MR-LM0820, Mirae RPM Co.).

When necessary, based on 100 parts by weight in sum of the components (A) and (B), the thermoplastic resin composition may further include 0.01 to 5 parts by weight, preferably 0.05 to 3 parts by weight, more preferably 0.1 to 2 parts by weight, still more preferably 0.2 to 1.5 parts by weight of each of one or more selected from the group consisting of a heat stabilizer, a light stabilizer, a dye, a pigment, a colorant, a lubricant, a release agent, an antistatic agent, an antibacterial agent, a processing aid, a metal deactivator, a flame retardant, a smoke suppressant, an anti-drip agent, an anti-friction agent, and an anti-wear agent. Within this range, the required physical properties of the thermoplastic resin composition of the present invention may be implemented without deterioration in the intrinsic physical properties thereof.

The heat stabilizer preferably includes a primary heat stabilizer and a secondary heat stabilizer.

For example, the primary heat stabilizer may be a phenolic heat stabilizer, and preferably includes one or more selected from the group consisting of 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,6-hexanediolbis-[3-(3,5-di-t-butyl-4-hydroxyphenyl)propionate], 2,2-thiodiehylenebis-[3-(3,5-di-t-butyl-4-hydroxyphenyl)propionate], 3,5-di-t-butyl-4-hydroxybenzylphosphonatediethyl ester, tris(2,6-dimethyl-3-hydroxy-4-t-butylbenzyl)isocyanurate, tris(3,5-di-t-butyl-4-hydroxybenzyl)isocyanurate, tris[(3,5-di-t-butyl-4-hydroxyphenyl)propionyloxyethyl]isocyanurate, tris(4-t-butyl-2,6-dimethyl-3-hydroxybenzyl)isocyanurate, 2,2'-methylenebis(4-methyl-6-t-butylphenol)terephthalate, 1,3,5-trimethyl-2,4,6-tris(3,5-di-t-butyl-4-hydroxybenzyl) benzene, 3,9-bis[1,1-dimethyl-2-{p-(3-t-butyl-4-hydroxy-5-methyl-phenyl)propionyloxy}ethyl]-2,4,8,10-tetraoxaspiro [5,5]undecane, 2,2-bis[4-(2-3,5-di-t-butyl hydroxyhydrocinnamoyloxy)ethoxyphenyl]propane, and p-(3,5-di-t-butyl-4-hydroxyphenyl)propionic acid stearyl ester, more preferably octadecyl 3-(3,5-ditert-butyl-4-hydroxyphenyl)propanoate (IR1076).

For example, the secondary heat stabilizer may be a phosphorus heat stabilizer, and preferably includes one or more selected from the group consisting of bis(diakylphenyl)pentaerythritol diphosphite ester, phosphite ester, trioctyl phosphite, trilauryl phosphite, tridecyl phosphite, (octyl) diphenyl phosphite, tris(2,4-di-t-butylphenyl) phosphite, triphenyl phosphite, tris(butoxyethyl) phosphite, tris(nonylphenyl) phosphite, distearylpentaerythritol diphosphite, tetra(tridecyl)-1,1,3-tris(2-methyl-5-t-butyl-4-hydroxy-phenyl)butane diphosphite, tetra(C12-C15 mixed alkyl)-4,4'-isopropylidenediphenyl diphosphite, tetra(tridecyl)-4,4'-butylidenebis(3-methyl-6-t-butylphenol)diphosphite, tris (mono- and di-mixed nonylphenyl)phosphite, hydrogenated 4,4'-isopropylidenediphenol polyphosphite, phenyl(4,4'-isopropylidenediphenol)pentaerythritol diphosphite, distearylpentaerythritol diphosphite, tris[4,4'-isopropylidenebis(2-t-butylphenol)] phosphite, di(isodecyl)phenyl phosphite, 4,4'-isopropylidenebis(2-t-butylphenol)bis(nonylphenyl) phosphite, bis(2,4-di-t-butyl-6-methylphenyl)ethyl phosphite, 2-[{2,4,8,10-tetra-t-butyldibenz[d,f][1.3.2]-dioxaphospepin-6-yl}oxy]-N,N-bis[2-[{2,4,8,10-tetra-t-butyl-dibenz[d,f][1.3.2]-dioxaphospepin-6-yl}oxy]ethyl]-ethanamine, and 6-[3-(3-t-butyl-4-hydroxy-5-methylphenyl)propoxy]-2,4,8,10-tetra-t-butyldibenz[d,f] [1.3.2]-dioxaphospepin, more preferably tris(2,4-di-tert-butylphenyl) phosphite (IF168).

The lubricant preferably includes one or more selected from the group consisting of an aliphatic amide-based lubricant, a fatty acid ester-based lubricant, and olefin-based wax.

The aliphatic amide-based lubricant preferably includes one or more selected from the group consisting of stearamide, oleamide, erucamide, ethylene bis stearamide, and ethylene bis oleamide.

The fatty acid ester-based lubricant preferably includes one or more selected from the group consisting of fatty acid esters of alcohols or polyhydric alcohols, hardened oil, butyl stearate, monoglyceride stearate, pentaerythritol tetrastearate, stearylstearate, ester wax, and alkyl phosphoric acid ester.

The olefin-based wax is preferably polyethylene wax.

For example, the light stabilizer may include one or more selected from the group consisting of a HALS-based UV stabilizer and a benzotriazole-based UV stabilizer, preferably a mixture of a HALS-based UV stabilizer and a benzotriazole-based UV stabilizer.

The HALS-based UV stabilizer preferably includes one or more selected from the group consisting of bis(2,2,6,6-tetramethyl-4-piperidinyl)sebacate (UV 770), bis[N-methyl-2,2,6,6-tetramethyl-4-piperidinyl]sebacate, and succinic acid dimethyl-1-(2-hydroxyethyl)-4-hydroxy-2,2,6,6-tetramethylpiperidine (Tinuvin 622), more preferably bis(2,2, 6,6-tetramethyl-4-piperidinyl)sebacate (UV 770).

The benzotriazole-based UV stabilizer preferably includes one or more selected from the group consisting of 2-(2'-hydroxy-5'-t-octylphenyl)-benzotriazole (Cyasorb UV-541), 2-(2'-hydroxy-5'-methylphenyl)benzotriazole (Tinuvin-P), 2 (2'-hydroxy-3'-tert-butyl-5'-methylphenyl)-5-chloro-benzotriazole (Tinuvin-326), 2-(2'-hydroxy-3',5'-di-tert-butylphenyl)-5-chloro-benzotriazole (Tinuvin-327), 2-(2'-hydroxy-3,5-ditert-amylphenyl)benzotriazole (Tinuvin-328), 2 (2'-hydroxy-3',5'-di(1,1-dimethylbenzyl)phenyl)-2H-benzotriazole (Tinuvin-234), 2-(2'-hydroxy-3',5'-di-t-butylphenyl)benzotriazole (Tinuvin-320), and 2-(2H-benzotriazole-2-yl)-4-(1,1,3,3-tetramethylbutyl)phenol (UV 329), more preferably 2-(2H-benzotriazole-2-yl)-4-(1,1,3,3-tetramethylbutyl)phenol (UV 329).

Method of Preparing Thermoplastic Resin Composition

A method of preparing the thermoplastic resin composition of the present invention includes a step of kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 50 to 120 nm and 25 to 75% by weight of a (meth)acrylic acid alkyl ester compound-aromatic vinyl compound-vinyl cyanide compound non-graft copolymer (B), wherein the thermoplastic resin composition has an alkyl acrylate coverage value (X) of 67% or more as calculated by Equation 1 below.

$$X=\{(G-Y)/Y\}\times100 \qquad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition.

In this case, the thermoplastic resin composition may have mechanical properties, such as impact strength, tensile strength, and flexural strength, and surface hardness equal or superior to those of a conventional ASA-based resin, may have excellent transparency and colorability, may prevent occurrence of whitening during bending due to excellent non-whitening properties, and thus, may have excellent surface appearance.

The method of preparing the thermoplastic resin composition shares all the technical characteristics of the thermoplastic resin composition described above, and thus repeated description thereof will be omitted.

The kneading and extrusion step is preferably performed at 200 to 300° C. in a size of 10 to 199 pi, more preferably at 210 to 260° C. in a size of 20 to 80 pi, still more preferably at 220 to 250° C. in a size of 25 to 75 pi using an extrusion kneader. Within this range, extrusion may be performed stably, and kneading may be performed efficiently. At this time, the temperature is cylinder temperature, and the pi means the outer diameter of a screw (unit: mm).

Extrusion kneaders commonly used in the art to which the present invention pertains may be used without particular limitation, and a twin-screw extrusion kneader is preferably used.

Molded Article

A molded article of the present invention includes the thermoplastic resin composition. In this case, mechanical properties, such as impact strength, tensile strength, and flexural strength, surface hardness, transparency, colorability, and non-whitening properties may be excellent. Thus, a molded article having an aesthetically pleasing appearance may be manufactured.

The molded article is preferably an injection-molded article, a calendering-molded article, or an extrusion-molded article. In this case, mechanical properties, such as impact strength, tensile strength, and flexural strength, surface hardness, gloss, and non-whitening properties may be excellent.

The molded article is preferably a film or a sheet, and as a specific example, may be a decorative sheet used for indoor furniture, indoor decorations, and the like, a finishing material for outdoor construction materials, or a finishing material for roofs.

A method of manufacturing the molded article preferably includes a step of kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 50 to 120 nm and 25 to 75% by weight of a (meth)acrylic acid alkyl ester compound-aromatic vinyl compound-vinyl cyanide compound non-graft copolymer (B) to obtain an extrudate and a step of performing injection molding, calender molding, or T-die extrusion molding of the extrudate at a molding temperature of 180 to 300° C. to manufacture a molded article. In this case, mechanical properties, such as impact strength, tensile strength, and flexural strength, surface hardness, transparency, and colorability may be excellent. In particular, occurrence of whitening during bending may be prevented due to excellent non-whitening properties.

For example, the extrudate may be in the form of pellets or in the form of a plate.

In this description, the plate-like shape is not particularly limited when the plate-like shape is commonly defined as a plate-like shape in the technical field to which the present invention pertains, and may include, for example, a flat shape, a sheet shape, a film shape, and the like.

As a preferred example, the step of manufacturing a molded article may include a step of calender-molding the prepared extrudate at a calender temperature of 140 to 220° C. to obtain a sheet. In this case, processability may be excellent, and a sheet having a uniform surface may be easily manufactured.

In this description, calender molding is a process of rolling an extrudate using calendering equipment including calendering rolls. Without particular limitation, calender molding may be performed according to a method commonly used in the art to which the present invention pertains. Preferably, calender molding may be performed according to a method including a step of mixing thermoplastic resin composition pellets as a sheet raw material at 130 to 200° C. using a mixer, a step of manufacturing a base sheet at 170 to 240° C. using the mixed raw material, and a step of manufacturing a sheet at 140 to 220° C. using the base sheet and calendering. For example, the step of manufacturing a base sheet may be performed using a mixing roll.

As another preferred example, the method of manufacturing a molded article may include a step of injection-molding the prepared extrudate at an injection temperature of 200 to 260° C., an injection pressure of 60 to 100 bar, and a holding pressure of 25 to 55 bar. In this case, an injection-molded article having excellent mechanical properties such as impact strength may be easily manufactured.

The injection temperature is preferably 200 to 250° C., more preferably 210 to 240° C. Within this range, an injection-molded article having excellent mechanical properties such as impact strength may be easily manufactured.

The injection pressure is preferably 70 to 90 bar, more preferably 75 to 85 bar. Within this range, an injection-molded article having excellent mechanical properties such as impact strength may be easily manufactured.

The holding pressure is preferably 30 to 50 bar, more preferably 35 to 50 bar. Within this range, an injection-molded article having excellent mechanical properties such as impact strength may be easily manufactured.

As another preferred example, the step of manufacturing a molded article may include a step of performing T-die extrusion molding of the prepared extrudate at an extrusion temperature of 200 to 300° C., an extrusion screw speed of 50 to 200 rpm, a 3-axis roll temperature of 60 to 100° C., and a roll rotation speed of 1 to 5 m/min. In this case, processability may be excellent, and a sheet having a uniform surface may be easily manufactured.

In describing the thermoplastic resin composition of the present invention, the method of preparing the same, and the molded article including the same, it should be noted that other conditions or equipment not explicitly described herein may be appropriately selected within the range commonly practiced in the art without particular limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples and Comparative Examples below are as follows.

Graft copolymer (A-1): ASA graft copolymer (core: 38% by weight of butyl acrylate and 7% by weight of styrene, shell: 4% by weight of butyl acrylate, 40% by weight of styrene, and 11% by weight of acrylonitrile, grafting degree: 70%) containing alkyl acrylate rubber having an average particle diameter of 90 to 110 nm prepared by emulsion polymerization Graft copolymer (A-2): ASA graft copolymer (core: 37% by weight of butyl acrylate and 9% by weight of styrene, shell: 4% by weight of butyl acrylate, 39% by weight of styrene, and 11% by weight of acrylonitrile, grafting degree: 70%) containing alkyl acrylate rubber having an average particle diameter of 90 to 110 nm prepared by emulsion polymerization Graft copolymer (A-3): ASA graft copolymer (core: 38% by weight of butyl acrylate and 7% by weight of styrene, shell: 4% by weight of butyl acrylate, 40% by weight of styrene, and 11% by weight of acrylonitrile, grafting degree: 60%) containing alkyl acrylate rubber having an average particle diameter of 90 to 110 nm prepared by emulsion polymerization Graft copolymer (A-4): ASA graft copolymer (core: 38% by weight of butyl acrylate and 2% by weight of styrene, shell: 4% by weight of butyl acrylate, 43% by weight of styrene, and 13% by weight of acrylonitrile, grafting degree: 70%) containing alkyl acrylate rubber having an average particle diameter of 90 to 110 nm prepared by emulsion polymerization Graft copolymer (A-5): ASA graft copolymer (core: 38% by weight of butyl acrylate and 2% by weight of styrene, shell: 4% by weight of butyl acrylate, 43% by weight of styrene, and 13% by weight of acrylonitrile, grafting degree: 60%) containing alkyl acrylate rubber having an average particle diameter of 90 to 110 nm prepared by emulsion polymerization Graft copolymer (A-6): ASA graft copolymer (core: 43% by weight of butyl acrylate and 2% by weight of styrene, shell: 4% by weight of butyl acrylate, 40% by weight of styrene, and 11% by weight of acrylonitrile, grafting degree: 50%) containing alkyl acrylate rubber having an average particle diameter of 90 to 110 nm prepared by emulsion polymerization Graft copolymer (A-7): ASA graft copolymer (core: 43% by weight of butyl acrylate and 17% by weight of styrene, shell: 4% by weight of butyl acrylate, 26% by weight of styrene, and 10% by weight of acrylonitrile, grafting degree: 70%) containing alkyl acrylate rubber having an average particle diameter of 150 to 200 nm prepared by emulsion polymerization Graft copolymer (A-8): ASA graft copolymer (core: 43% by weight of butyl acrylate and 7% by weight of styrene, shell: 4% by weight of butyl acrylate, 35% by weight of styrene, and 11% by weight of acrylonitrile, grafting degree: 80%) containing alkyl acrylate rubber having an average particle diameter of 25 to 35 nm prepared by emulsion polymerization (Meth)acrylic acid alkyl ester compound-aromatic vinyl compound-vinyl cyanide compound non-graft copolymer (B-1): Methylmethacrylate-acrylonitrile-styrene (SAMMA) resin (XT500 manufactured by LG Chemical Co., weight average molecular weight: 80,000 g/mol) prepared by bulk polymerization (Meth)acrylic acid alkyl ester compound-aromatic vinyl compound-vinyl cyanide compound non-graft copolymer (B-2): Methylmethacrylate-acrylonitrile-styrene (SAMMA) resin (XT510 manufactured by LG Chemical Co., weight average molecular weight: 130,000 g/mol) prepared by bulk polymerization Styrene-acrylonitrile (SAN) resin (B-3): 81HF (weight average molecular weight: 130,000 g/mol, LG Chemical Co.)

Examples 1 to 7 and Comparative Examples 1 to 7

According to the contents shown in Tables 1 and 2, the components shown in Tables 1 and 2 were fed into a twin-screw extruder. At this time, 0.1 to 2 parts by weight of each of a lubricant (PASFLOW7501, Patech Fine Chemical Co.), a primary heat stabilizer (IR1076), a secondary heat stabilizer (IF168), a HALS-based UV stabilizer (UV 770), and a benzotriazole-based UV stabilizer (UV 329) were fed into the twin-screw extruder. Then, melt-kneading and extrusion were performed at 230° C. and 150 rpm to prepare pellets. Then, the pellets were injected at 200 to 240° C. and a screw speed of 100 to 200 rpm using an injection machine (VC 330/80 TECJ PRO, ENGEL Co.) to obtain a specimen for evaluating appearance and physical properties. In addition, a sheet having a thickness of 0.15 mm was prepared at an extrusion screw speed of 150 to 200 rpm, a temperature of 200 to 280° C., a 3-axis roll temperature of 80° C., and a roll rotation speed of 1.5 m/min using the prepared pellets and a T-die extruder (ST32HS, twin screw, 32 T, L/D=44, Hankook E.M Co.). Then, haze difference and non-whitening properties according to ball dropping was measured.

Test Examples

The properties of the injection specimens and the extrusion specimens prepared in Examples 1 to 7 and Comparative Examples 1 to 7 were measured according to the following methods, and the results are shown in Tables 1 and 2 and FIG. 1.

Measurement Methods

Alkyl acrylate coverage value (%): Alkyl acrylate coverage value was calculated by Equation 1 below.

$$X = \{(G-Y)/Y\} \times 100 \qquad \text{[Equation 1]}$$

In Equation 1, G represents a gel content (wt %) based on a total weight of the thermoplastic resin composition, and Y represents the content (wt %) of an alkyl acrylate in the gel based on a total weight of the thermoplastic resin composition. Here, the content of the alkyl acrylate in the gel was quantitatively measured through $^1$H NMR analysis or FT-IR analysis.

$^1$H NMR

Equipment name: Bruker 600 MHz NMR (AVANCE III HD) CPP BB (1H 19F tunable and broadband, with z-gradient) Prodigy Probe Measurement conditions: $^1$H NMR (zg30): ns=32, d1=5 s, TCE-d2, at room temperature

FT-IR

Equipment name: Agilent Cary 660

Measurement conditions: ATR mode

When measuring the gel content, 1 g of a thermoplastic resin composition in pellet form was added to 30 ml of acetone, followed by stirring at room temperature for 12 hours. Then, centrifugation was performed to separate insoluble matter that was not dissolved in acetone, followed by drying for 12 hours. Then, the gel content was measured and calculated by Equation 2 below.

$$\text{Gel content (\%)}=[\text{Weight } (g) \text{ of insoluble matter } (gel)/\text{Weight } (g) \text{ of sample}]\times100 \qquad \text{[Equation 2]}$$

Grafting degree (%): 0.5 g of a powdered graft copolymer was added to 50 ml of acetone, stirred at room temperature for 12 hours, and centrifuged to separate insoluble matter that was not dissolved in acetone, followed by drying for 12 hours. The weight of the insoluble matter was measured, and grafting degree was calculated by Equation 3 below.

$$\text{Grafting degree (\%)}=[\text{Weight } (g) \text{ of grafted monomers/Rubber weight } (g)]\times100 \qquad \text{[Equation 3]}$$

In Equation 3, the weight (g) of grafted monomers is obtained by subtracting the rubber weight (g) from the weight of insoluble matter (gel) obtained by dissolving a graft copolymer in acetone and performing centrifugation, and the rubber weight (g) is the weight (g) of rubber components theoretically added to 0.5 g of graft copolymer powder.

Specifically, when measuring the weight (g) of insoluble matter (gel), 0.5 g of a powdered graft copolymer was added to 50 ml of acetone, followed by stirring at 210 rpm and room temperature using an orbital shaker (equipment name: Lab companion SKC-6075) for 12 hours. Then, centrifugation was performed at 0° C. and 18,000 rpm for 3 hours using a centrifuge (Supra R30, Hanil Science Co.) to separate insoluble matter that was not dissolved in acetone, followed by drying in a forced convection oven (equipment name: Lab companion OF-12GW) set to 85° C. for 12 hours via forced circulation. Then, the weight of the insoluble matter (gel) was measured.

Izod impact strength (kgf·cm/cm): Izod impact strength was measured at 23° C. using an injection specimen (thickness: ¼") according to ASTM D256.

Tensile strength (kgf/cm$^2$): Tensile strength was measured at a cross head speed of 50 mm/min using an injection specimen (thickness: 3.2 mm) according to ASTM D638.

Flexural strength (kgf/cm$^2$): Flexural strength was measured at a span of 64 mm and a test speed of 10 mm/min using an injection specimen (thickness: 3.2 mm) according to ASTM D790.

Surface hardness: Rockwell hardness was measured in an R-scale using an injection specimen (thickness: 3.2 mm) according to ASTM D785.

Gloss: Gloss was measured at an angle of incidence of 45° using an injection specimen having a thickness of 3 T and a gloss meter according to ASTM D2457.

Total light transmittance (Tt, %): Total light transmittance was measured using an injection specimen having a thickness of 3 T and a haze meter (HM-150, Murakami Lab Co.) according to ASTM D-1003.

Haze (%): Haze was measured using an injection specimen having a thickness of 3 T and a haze meter (HM-150, Murakami Lab Co.) according to ASTM D-1003.

Whether whitening occurs after ball dropping: A 1 kg weight was vertically dropped onto a T-die extrusion film having dimensions of 0.15 mm×10 cm×10 cm in thickness, width, and length from a height of 25 cm using a Gardner impact tester. Then, whether whitening occurred in a portion of the film hit by the weight was determined by visual observation, and occurrence of whitening was evaluated according to the following criteria.

○: No whitening occurs (non-whitening) after ball dropping

X: Whitening occurs after ball dropping

Haze difference (Δhaze) according to ball dropping: A 1 kg weight was vertically dropped onto a T-die extrusion film having dimensions of 0.15 mm×10 cm×10 cm in thickness, width, and length from a height of 25 cm using a Gardner impact tester. Then, haze values before and after impact at a portion of the film hit by the weight were measured according to ASTM D1003, and haze difference was calculated by Equation 4 below.

$$\text{Haze difference (Δhaze)}=\text{Haze value after ball dropping}-\text{haze value before ball dropping} \qquad \text{[Equation 4]}$$

Thickness deviation (mm) after calendering: Using a roll mill machine (MR-LM0820, Mirae RPM Co.) in which two rolls having a diameter of 30 cm were installed at an interval of 0.3 mm, calendering of an extruded thermoplastic resin composition in pellet form was performed while maintaining the temperature of the rolls at 180 to 210° C. to obtain a sheet having a thickness of 0.3 mm. Then, thickness was measured at 10 or more locations in an area except for an area within 2 to 3 cm from both ends of the obtained sheet having a size of 15 cm (length)×15 cm (width), and thickness deviation was calculated based on a difference between the maximum and minimum thicknesses. At this time, thickness was measured using ABSOLUTE ID-C1012BS (Mitutoyo Co.).

Thickness deviation (mm) after T-die extrusion: Using a T-die extruder (ST32HS, Twin screw, 32 T, L/D=44, Hankook E.M Co.), T-die extrusion was performed at an extrusion screw speed of 150 to 200 rpm, an extrusion temperature of 200 to 280° C., a 3-axis roll temperature of 80° C., and a roll rotation speed of 1.5 m/min to obtain a sheet having a thickness of 0.15 mm. The sheet was cut to a length of 100 cm, thickness was measured at 10 or more locations in an area except for an area within 2 to 3 cm from both ends of the sheet, and thickness deviation was calculated based on a difference between the maximum and minimum thicknesses. At this time, thickness was measured using ABSOLUTE ID-C1012BS (Mitutoyo Co.).

TABLE 1

| Classification (parts by weight) | Example 1 | Example 2 | Example 3 | Example 4 | Example 5 | Example 6 | Example 7 |
|---|---|---|---|---|---|---|---|
| ASA (A-1) | 30 | 50 | 70 | | | | 50 |
| ASA (A-2) | | | | 50 | | | |
| ASA (A-3) | | | | | 50 | | |
| ASA (A-4) | | | | | | 50 | |
| SAMMA (B-1) | 70 | 50 | 30 | 50 | 50 | 50 | 30 |
| SAMMA (B-2) | | | | | | | 20 |
| Rubber particle diameter (nm) of ASA (A) | 90~110 | 90~110 | 90~110 | 90~110 | 90~110 | 90~110 | 90~110 |
| Grafting degree (%) of ASA (A) | 70 | 70 | 70 | 70 | 60 | 70 | 70 |
| Alkyl acrylate coverage value (%) | 90 | 90 | 90 | 99 | 80 | 71 | 90 |
| Physical properties | | | | | | | |
| Impact strength (kgf · cm/cm) | 3.2 | 4.4 | 8.5 | 4.2 | 4.5 | 4.3 | 4.9 |
| Tensile strength (kgf/cm$^2$) | 550 | 400 | 300 | 394 | 398 | 401 | 403 |
| Flexural strength (kgf/cm$^2$) | 870 | 650 | 480 | 645 | 645 | 650 | 655 |
| Surface hardness | 110 | 94 | 73 | 93 | 94 | 95 | 97 |
| Gloss | 150 | 146 | 131 | 147 | 142 | 145 | 149 |
| Total light transmittance (Tt, %) | 85 | 82 | 76 | 81 | 80 | 83 | 82 |
| Haze (%) | 3 | 5 | 8 | 5 | 6 | 6 | 5 |
| Haze difference (Δhaze) | 5.4 | 4.2 | 2.9 | 4.8 | 4.6 | 6.1 | 4.5 |
| Whether whitening occurs after ball dropping | ○ | ○ | ○ | ○ | ○ | ○ | ○ |
| Thickness deviation (mm) after calendering | 0.03 | 0.05 | 0.08 | 0.06 | 0.05 | 0.07 | 0.09 |
| Thickness deviation (mm) after T-die processing | 0.02 | 0.04 | 0.05 | 0.04 | 0.05 | 0.05 | 0.06 |

TABLE 2

| Classification (parts by weight) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| ASA (A-1) | 20 | 80 | | 50 | | | |
| ASA (A-5) | | | 50 | | | | |
| ASA (A-6) | | | | | 50 | | |
| ASA (A-7) | | | | | | 50 | |
| ASA (A-8) | | | | | | | 50 |
| SAMMA (B-1) | 80 | 20 | 50 | | 50 | 50 | 50 |
| SAN (B-3) | | | | 50 | | | |
| Rubber particle diameter (nm) of ASA (A) | 90~110 | 90~110 | 90~110 | 90~110 | 90~110 | 150~200 | 25~35 |
| Grafting degree (%) of ASA (A) | 70 | 70 | 60 | 70 | 50 | 70 | 80 |
| Alkyl acrylate coverage value (%) | 90 | 90 | 62 | 90 | 51 | 86 | 95 |
| Physical properties | | | | | | | |
| Impact strength (kgf · cm/cm) | 2.5 | 10.1 | 6 | 4.9 | 6.3 | 14.4 | 2 |
| Tensile strength (kgf/cm$^2$) | 680 | 220 | 380 | 400 | 385 | 340 | 600 |
| Flexural strength (kgf/cm$^2$) | 980 | 310 | 630 | 640 | 630 | 520 | 820 |
| Surface hardness | 121 | 55 | 90 | 89 | 90 | 77 | 115 |
| Gloss | 157 | 130 | 130 | 140 | 120 | 8 | 162 |
| Total light transmittance (Tt, %) | 88 | 71 | 80 | 24 | 73 | 54 | 89 |

TABLE 2-continued

| Classification (parts by weight) | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Haze (%) | 3 | 15 | 7 | 84 | 12 | 38 | 2 |
| Haze difference (Δhaze) | Broken | 2.7 | 7.5 | 11.1 | 8.2 | 14.1 | Broken |
| Whether whitening occurs after ball dropping | X | ○ | X | X | X | X | X |
| Thickness deviation (mm) after calendering | 0.03 | 0.12 | 0.1 | 0.05 | 0.1 | 0.08 | 0.03 |
| Thickness deviation (mm) after T-die processing | 0.02 | 0.09 | 0.07 | 0.05 | 0.06 | 0.07 | 0.03 |

As shown in Tables 1 and 2, Examples 1 to 7 according to the present invention had excellent transparency and colorability due to high gloss and total light transmittance and low haze while having mechanical properties, such as impact strength, tensile strength, and flexural strength, and surface hardness equal or superior to those of Comparative Examples 1 to 7 outside of the range of the present invention. In addition, in the case of Examples 1 to 7, due to excellent non-whitening properties, occurrence of whitening during bending was prevented. In contrast, in the case of Comparative Example 1 including the ASA resin (A) in an amount less than the range of the present invention, impact strength was low, and whitening occurred. In addition, after ball dropping, a specimen was broken, so haze difference could not be measured. In the case of Comparative Example 2 including the ASA resin (A) in an amount exceeding the range of the present invention, tensile strength, flexural strength, surface hardness, and total light transmittance were low, and haze was high, resulting in deterioration of transparency. In addition, the thickness deviation of a sheet increased after calendering and T-die extrusion processing. In addition, in the case of Comparative Examples 3 and 5 having an alkyl acrylate coverage value less than the range of the present invention, haze difference increased, and whitening occurred. In addition, the thickness deviation of a sheet increased after calendering and T-die extrusion processing.

In addition, in the case of Comparative Example 4 including the SAN resin (B-3), haze and haze difference increased, and whitening occurred.

In addition, in the case of Comparative Example 6 including the ASA resin (A) containing rubber having an average particle diameter exceeding the range of the present invention, haze and haze difference increased, total light transmittance was low, and whitening occurred. In the case of Comparative Example 7 including the ASA resin (A) containing rubber having an average particle diameter less than the range of the present invention, impact strength was low, and whitening occurred. In addition, after ball dropping, a specimen was broken, so haze difference could not be measured.

In addition, as shown in FIG. 1 below, compared to Comparative Examples 1 and 6, in the case of Example 3 according to the present invention, no whitening was observed after ball dropping, indicating that appearance was excellent.

The invention claimed is:

1. A thermoplastic resin composition, comprising:
25 to 75% by weight of an alkyl acrylate-aromatic vinyl compound-vinyl cyanide compound graft copolymer (A) containing alkyl acrylate rubber having an average particle diameter of 60 to 120 nm; and 25 to 75% by weight of a (meth)acrylic acid alkyl ester compound-aromatic vinyl compound-vinyl cyanide compound non-graft copolymer (B),
wherein the thermoplastic resin composition has an alkyl acrylate coverage value (X) of 67% or more as calculated by Equation 1 below:

$$X=\{(G-Y)/Y\}\times100,\qquad\text{[Equation 1]}$$

wherein G represents a content (wt %) of a gel based on a total weight of the thermoplastic resin composition, and Y represents a content (wt %) of the alkyl acrylate in the gel based on the total weight of the thermoplastic resin composition,
wherein the content of the alkyl acrylate in the gel is measured by nuclear magnetic resonance (NMR) analysis or Fourier transform infrared spectroscopy (FT-IR) analysis,
wherein the graft copolymer (A) comprises 20 to 60% by weight of the alkyl acrylate rubber and 40 to 60% by weight of an aromatic vinyl compound-vinyl cyanide compound copolymer (a-2),
wherein based on 100% by weight in total of the acrylate rubber, the alkyl acrylate rubber includes the aromatic vinyl compound in an amount of 5 to 20% by weight, and
wherein, when a 1 kg weight is vertically dropped onto an extruded film having dimensions of 0.15 mm×10 cm×10 cm in thickness, width, and length from a height of 25 cm using a Gardner impact tester, the thermoplastic resin composition is in a form of the extruded film, and haze values before and after impact are measured for a portion of the extruded film hit by the weight according to ASTM D1003, a difference in the haze values before and after the impact is calculated, and a haze difference (ΔHaze) is 6.7 or less.

2. The thermoplastic resin composition according to claim 1, wherein the non-graft copolymer (B) comprises:
60 to 85% by weight of a (meth)acrylic acid alkyl ester compound,
5 to 30% by weight of an aromatic vinyl compound, and
1 to 25% by weight of a vinyl cyanide compound.

3. The thermoplastic resin composition according to claim 1, wherein the non-graft copolymer (B) has a weight average molecular weight of 30,000 to 150,000 g/mol.

4. The thermoplastic resin composition according to claim 1, wherein the graft copolymer (A) has a grafting degree of 55% or more as calculated by Equation 3 below:

Grafting degree (%)=[Weight(*g*) of grafted mono-
mers/Rubber weight(*g*)]×100,     [Equation 3]

wherein the weight (g) of the grafted monomers is obtained by subtracting the rubber weight (g) from a weight of the gel, which is obtained by dissolving the graft copolymer (A) in acetone and performing centrifugation, and the rubber weight (g) is a weight (g) of rubber components added during polymerization.

5. The thermoplastic resin composition according to claim 1, wherein the thermoplastic resin composition has a total light transmittance (Tt) of 74% or more as measured using an injection specimen having a thickness of 3 T according to ASTM D-1003.

6. The thermoplastic resin composition according to claim 1, wherein the thermoplastic resin composition has a haze of 10% or less as measured using an injection specimen having a thickness of 3 T according to ASTM D-1003.

7. The thermoplastic resin composition according to claim 1, wherein, the thermoplastic resin composition is in a form of a T-die extruded sheet having a thickness of 0.15 mm and a length of 100 cm, and when thickness is measured at 10 or more locations in an area except for an area within 2 to 3 cm from both ends of the T-die extruded sheet, thickness deviation is calculated based on a difference between maximum and minimum thicknesses, and a thickness deviation is 0.07 mm or less.

8. The thermoplastic resin composition according to claim 1, further comprising one or more selected from the group consisting of a heat stabilizer, a light stabilizer, a dye, a pigment, a colorant, a lubricant, a release agent, an antistatic agent, an antibacterial agent, a processing aid, a metal deactivator, a flame retardant, a smoke suppressant, an anti-drip agent, an anti-friction agent, and an anti-wear agent.

9. A method of preparing a thermoplastic resin composition, comprising kneading and extruding, at 200 to 300° C. and 100 to 500 rpm, 25 to 75% by weight of an alkyl acrylate-aromatic vinyl compound-vinyl cyanide compound graft copolymer (A) containing alkyl acrylate rubber having an average particle diameter of 60 to 120 nm and 25 to 75% by weight of a (meth)acrylic acid alkyl ester compound-aromatic vinyl compound-vinyl cyanide compound non-graft copolymer (B), wherein the thermoplastic resin composition has an alkyl acrylate coverage value (X) of 67% or more as calculated by Equation 1 below:

$$X=\{(G-Y)/Y\}\times100,$$     [Equation 1]

wherein G represents a content (wt %) of a gel based on a total weight of the thermoplastic resin composition, and Y represents a content (wt %) of the alkyl acrylate in the gel based on the total weight of the thermoplastic resin composition, wherein the content of the alkyl acrylate in the gel is measured by nuclear magnetic resonance (NMR) analysis or Fourier transform infrared spectroscopy (FT-IR) analysis, wherein the graft copolymer (A) comprises 20 to 60% by weight of the alkyl acrylate rubber and 40 to 60% by weight of an aromatic vinyl compound-vinyl cyanide compound copolymer (a-2), wherein based on 100% by weight in total of the acrylate rubber, the alkyl acrylate rubber includes the aromatic vinyl compound in an amount of 5 to 20% by weight, and wherein, the thermoplastic resin composition is in a form of an extruded film having dimensions of 0.15 mm×10 cm×10 cm in thickness, width, and length, and when a 1 kg weight is vertically dropped onto the extruded film from a height of 25 cm using a Gardner impact tester, haze values before and after impact are measured for a portion of the extruded film hit by the weight according to ASTM D1003, a difference in the haze values before and after the impact is calculated, and a haze difference (ΔHaze) is 6.7 or less.

10. A molded article comprising the thermoplastic resin composition according to claim 1.

11. The molded article according to claim 10, wherein the molded article is an injection-molded article, a calendering-molded article, or an extrusion-molded article.

12. A thermoplastic resin composition, comprising:

25 to 75% by weight of an alkyl acrylate-aromatic vinyl compound-vinyl cyanide compound graft copolymer (A) containing alkyl acrylate rubber having an average particle diameter of 60 to 120 nm; and 25 to 75% by weight of a (meth)acrylic acid alkyl ester compound-aromatic vinyl compound-vinyl cyanide compound non-graft copolymer (B), wherein the thermoplastic resin composition has an alkyl acrylate coverage value (X) of 67% or more as calculated by Equation 1 below:

$$X=\{(G-Y)/Y\}\times100,$$     [Equation 1]

wherein G represents a content (wt %) of a gel based on a total weight of the thermoplastic resin composition, and Y represents a content (wt %) of the alkyl acrylate in the gel based on the total weight of the thermoplastic resin composition, wherein the content of the alkyl acrylate in the gel is measured by nuclear magnetic resonance (NMR) analysis or Fourier transform infrared spectroscopy (FT-IR) analysis, wherein the graft copolymer (A) comprises 20 to 60% by weight of the alkyl acrylate rubber and 40 to 60% by weight of an aromatic vinyl compound-vinyl cyanide compound copolymer (a-2), and wherein based on 100% by weight in total of the acrylate rubber, the alkyl acrylate rubber includes the aromatic vinyl compound in an amount of 5.0 to 19.6% by weight.

\* \* \* \* \*